3,629,467
PHARMACEUTICAL PREPARATIONS CONTAINING A 2,4-DIAMINO-6-SUBSTITUTED-S-TRIAZINE AND METHODS OF USING SAME
Charles D. Bossinger, Olympia Fields, and Takashi Enkoji, Park Forest, Ill., assignors to Armour Pharmaceutical Company, Chicago, Ill.
No Drawing. Filed Oct. 17, 1969, Ser. No. 867,364
Int. Cl. A61u 27/00
U.S. Cl. 424—249
20 Claims

ABSTRACT OF THE DISCLOSURE

Preparations containing 2,4-diamino - 6 - substituted-s-triazines and methods of using same whereby a host, including man, to whom such preparations are administered, preferably per os, is caused to secrete endogenous adrenocorticotropic hormone which increases the blood levels of endogenous adrenocoticosteroids in the host to his benefit while avoiding the adverse effects of hyperadrenocorticosteroidism. The methods hereof also obtain antiinflammatory relief in the host independently of adrenal axis stimulation.

The triazine compounds have the structure:

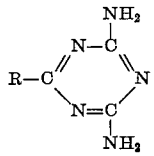

wherein R is a phenyl or substituted phenyl in which the substituted moiety is selected from the group consisting of halo, alkyl, alkoxy, and fluoroalkyl.

DISCLOSURE OF INVENTION

This invention relates to pharmaceutical preparations and their use and more particularly to the unexpected benefits obtained when a preparation containing 2,4-diamino-6-phenyl-s-triazine or certain derivatives thereof is administered to a host afflicted with an inflammatory condition or suffering from hypoadrenocorticosteroidism.

The properties of these compounds and particularly their corticotrophin-releasing properties, make this a highly valuable discovery since, as used, it provides an orally administered medication which is clinically comparable to ACTH, and thereby obtains the effect of ACTH therapy without requiring parenteral administration to the host.

The compounds of this invention have the structural formula:

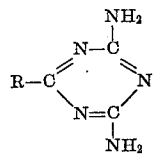

wherein R is phenyl or a substituted phenyl in which the substituting moiety is selected from the group consisting of halo, alkyl, alkoxy and fluoroalkyl. For purpose of this disclosure the terms alkyl and alkoxy are employed to define the lower members of the hydrocarbon series, that is, those members having from 1-4 carbon atoms.

Representative compounds useful in the preparation and methods of the present invention are:

2,4-diamino-6-phenyl-s-triazine (also known as "benzoguanamine");
2,4-diamino-6-m-methylphenyl-s-triazine;
2,4-diamino-6-o-methylphenyl-s-triazine;
2,4-diamino-6-p-methylphenyl-s-triazine;
2,4-diamino-6-o-chlorophenyl-s-triazine;
2,4-diamino-6-m-chlorophenyl-s-triazine;
2,4-diamino-6-p-chlorophenyl-s-triazine;
2,4-diamino-6-o-fluorophenyl-s-triazine;
2,4-diamino-6-m-fluorophenyl-s-triazine;
2,4-diamino-6-p-fluorophenyl-s-triazine;
2,4-diamino-6-p-methoxyphenyl-s-triazine;
2,4-diamino-6-m-methoxyphenyl-s-triazine;
2,4-diamino-6-o-methoxyphenyl-s-triazine;
2,4-diamino-6-p-dimethylaminophenyl-s-triazine;
2,4-diamino-6-(3,4-dimethoxyphenyl)-s-triazine;
2,4-diamino-6-(3,4,5-trimethoxyphenyl)-s-triazine;
2,4-diamino-6-o-trifluoromethylphenyl-s-triazine;
2,4-diamino-6-m-trifluoromethylphenyl-s-triazine;
2,4-diamino-6-p-dimethylaminophenyl-s-triazine;
2,4-diamino-6-(3,4-methylenedioxyphenyl)-s-triazine;
2,4-diamino-6-o-ethylphenyl-s-triazine;
2,4-diamino-6-p-ethylphenyl-s-triazine;
2,4-diamino-6-m-ethylphenyl-s-triazine;
2,4-diamino-6-o-propylphenyl-s-triazine;
2,4-diamino-6-p-propylphenyl-s-triazine;
2,4-diamino-6-m-propylphenyl-s-triazine;
2,4-diamino-6-o-butylphenyl-s-triazine;
2,4-diamino-6-p-butylphenyl-s-triazine;
2,4-diamino-6-m-butylphenyl-s-triazine;
2,4-diamino-6-o-ethoxyphenyl-s-triazine;
2,4-diamino-6-p-ethoxyphenyl-s-triazine;
2,4-diamino-6-m-ethoxyphenyl-s-triazine;
2,4-diamino-6-m-propoxyphenyl-s-triazine;
2,4-diamino-6-o-propoxyphenyl-s-triazine;
2,4-diamino-6-p-propoxyphenyl-s-triazine;
2,4-diamino-6-o-butoxyphenyl-s-triazine;
2,4-diamino-6-m-butoxyphenyl-s-triazine;
2,4-diamino-6-p-butoxyphenyl-s-triazine;

and the like compounds falling within the sub genus identified as: 2,4-diamino - 6 - alkylphenyl-s-triazines wherein "alkyl" defines one to three alkyl groups having not over four carbon atoms; 2,4-diamino-6-alkoxyphenyl-s-triazines wherein "alkoxy" defines one to three alkoxy groups having not over four carbon atoms; 2,4-diamino-6-halophenyl-s-triazine wherein "halo" defines a chloro or fluoro group; and 2,4-diamino - 6 - trifluoroalkylphenyl-s-triazine wherein "alkyl" defines a hydrocarbon having not over four carbon atoms. Our entire group of compounds, for ease of expression, shall, from time to time, hereinafter be referred to as "benzoguanamine and selected derivatives thereof." The term also includes the non-toxic acid salts of each compound as will be later explained.

While benzoguanamine is a known chemical compound, the beneficial effects obtained when it and its selected derivatives and their salts are formulated into pharmaceutically acceptable dosage forms and administered to a host requiring therapy, especially anti-inflammatory therapy, is new and totally unexpected.

Thus, the present invention is predicated upon our discovery that beneficial effects are obtainable when benzoguanamine, its selected derivatives, and their salts are employed in pharmaceutically acceptable dosage forms which effectively disseminate the compound within the host to which it is administered.

"Inflammatory conditions" as that term is used herein, refers to those physical conditions exhibiting one or more of the symptoms: redness, pain, heat and swelling. In the past, inflammatory conditions have been treated with various analgesics, antipyretics, antibiotics, narcotics, hormones, steroids, and the so-called non-steroidal anti-inflammatory agents, alone or in combination. In some inflammatory conditions, such as arthritis, particularly rheumatoid arthritis, one generally accepted approach has been treatment by the administration of adrenocorticosteroids, if and when the subject can assimilate and tolerate such drugs. However, extreme care must be exercised in administering exogenous steroids so as to avoid or minimize the various undesirable side effects which, as is well known in the art, are frequently encountered with such drugs.

The term "ACTH-therapy," as used herein, refers to the treatment of those conditions which are ameliorated by the administration to the subject so afflicted of the anterior pituitary hormone (adrenocorticotropic hormone, hereinafter referred to as "ACTH") which will stimulate a functioning adrenal cortex to produce and secrete all of its endogenous steroids, which number over thirty. The therapy is to be contrasted to "steroid therapy," that is, the administration of exogenous corticosteroids, mentioned above, which, in varying degrees, depress adrenal cortical function and may ultimately produce adrenocortical atrophy. Adrenocortical insufficiency, such as that which results from the prolonged or injudicious use of cortisone, hydrocortisone, prednisone, prednisolone, and comparable exogenous corticosteroids, is one condition which may be ameliorated or cured by the administration of ACTH and therefore demonstrates "ACTH-therapy."

"ACTH-therapy" has been accepted by the medical profession in the treatment of angioneurotic edema; asthma; hay fever; serum sickness; acute rhematic fever; rheumatoid arthritis; bursitis; lupus erythematosus; periarteritis nodosa; psoriatic arthritis; scleroderma; rheumatoid spondylitis; Still's disease; tenosynovitis; anogenital pruritus; atopic dermatitis; dermatitis venenata; dermatitis medicamentosa; exfoliative dermatitis; dermatomyositis; pemphigus; psoriasis; urticaria; panhypopituitarism; choroiditis; conjunctivitis; glaucoma, acute secondary; iritis; keratitis; optic neuritis; sympathetic ophthalmia; uveitis acquired hemolytic jaundice; agranulocytosis; aplastic anemia; Bell's palsy; beryllium poisoning; burns, erythema nodosum; erythroblastosis fetallis; fibrositis; gout; Guillain-Barre syndrome; heat sickness; hepatic coma; Hodgkin's disease; hypoglycemia; idiopathic infections; acute overwhelming (e.g., peritonitis, meningitis) infections; insect bites; leukemias, acute and chronic lymphatic; Loeffler's syndrome; myositis; nephrotic syndrome; neuritis; orchitis; rhinitis; sarcoidosis; shoulder-hand syndrome; snake bite; sprue syndrome; Stevens-Johnson syndrome; thyroiditis; and ulcerative colitis.

One disadvantage of ACTH-therapy is the requirement for parenteral administration whereby the patient must make frequent and often inconvenient trips to a doctor's office or clinic to receive injections of the hormone. Efforts through the years to develop an effective oral dosage form of ACTH have failed and therefore a great need persists whereby the benefit of the pan-adrenocorticosteriod-releasing action of ACTH can be obtained in a more convenient orally administered dosage form.

Another disadvantage of ACTH therapy is the possibility of overdosage effects, similar to those described for exogenous steroids. Thus, a need also exists whereby the benefits of ACTH therapy are made available in a form wherein the danger of overdosage is substantially reduced or completely eliminated.

The present invention is based upon our discovery of the remarkably unexpected action obtained when preparations containing benzoguanamine and its selected derivatives as herein defined, and the non-toxic salts thereof, are administered to a host having a functioning pituitary and adrenal cortex which action results in the release from the pituitary of ACTH which in turn stimulates the adrenal cortex to release therefrom its full complement of endogenous adrenocorticosteroids.

Furthermore, the steroidogenic properties of benzoguanamine, its selected derivatives as herein defined, and the non-toxic salts thereof, are self-limiting in that the increased steroid levels resulting from their use will of themselves inhibit further stimulating action by the drug thus preventing overdosage effects.

Accordingly, a prime object of the present invention is to provide a new and useful pharmaceutical preparation containing, as its principal active ingredient, a compound selected from the group consisting of 2,4-diamino-6-phenyl-s-triazine, its selected derivatives as herein defined, and their non-toxic acid salts.

Another object of the present invention is to provide a new pharmaceutical preparation which has the unexpected property of initiating, in a host having a functioning pituitary and adrenal cortex, the controlled release of adrenocorticotropin from the pituitary of the host to whom it is administered and thereby inducing the production of endogenous adrenocorticosteroids.

A still further object of the present invention is to provide a new pharmaceutical preparation which is also a potent non-steroidal anti-inflammatory agent, per se, and which in use substantially avoids the onerous side effects accompanying the treatment of inflammatory conditions with exogenous steroids.

Still another object of the present invention is to provide a pharmaceutical preparation which confers the benefits of ACTH therapy and may be administered orally.

Another object of the present invention is to provide methods and preparations which increase the circulating level of adrenocorticosteroids in a host to whom no exogenous steroids have been administered.

Still another object of the present invention is to provide methods and preparations for providing ACTH therapy which are beneficial but are self-regulating to avoid overdosage effects.

These and still further objects as shall hereinafter appear are fulfilled by the present invention in a remarkably unexpected manner as will be readily discerned from a careful consideration of the following detailed description of methods and preparations comprising exemplary embodiments thereof.

In one practice of the present invention, 2,4-diamino-6-phenyl-s-triazine is prepared by condensing benzonitrile with dicyandiamide in the presence of potassium hydroxide according to the reaction:

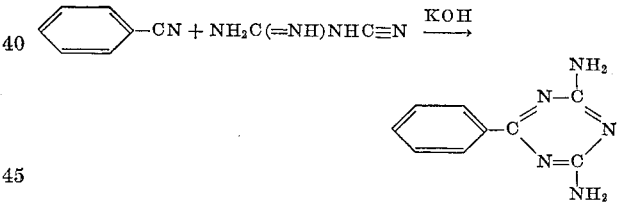

The reagents are heated with stirring in the presence of a suitable solvent, such as 2-methoxyethanol, and after about 2 hours, the mixture is cooled to about 25° C. and filtered. The crude product is then resuspended in hot water, refiltered and washed. The washed product is thereafter dried to constant weight to eliminate excessive moisture therefrom and is 2,4-diamino-6-phenyl-s-triazine.

The finished compound may thereafter be formulated into pharmaceutical unit dosage forms using the known procedures of mixing, granulating, compressing, suspending or dissolving and adding suitable pharmaceutical carriers or non-toxic excipients thereto.

In the preferred embodiment of our invention, the principal active ingredient of our pharmaceutical preparation is 2,4-diamino-6-phenyl-s-triazine, one of its selected derivatives, or a pharmaceutically acceptable salt thereof, e.g., the non-toxic salts of sulfuric, nitric, phosphoric, citric, acetic, lactic, tartaric, sulfamic, succinic, fumaric, maleic, ethanedisulfonic, hydrobromic, hydrochloric, benzoic and similar acids. The acceptable salts may be formed by reacting the triazine base with excess acid in a suitable solvent such as ethanol, ether, acetone, water or mixtures thereof. The mixture is heated to facilitate solution and the salts crystallize therefrom on cooling.

The preferred dosage forms consist of our principal active ingredient associated with an acceptable pharmaceutical carrier. The carrier is a non-toxic pharmaceutical grade substance which may be either solid or liquid. Suitable flavors or sweeteners may also be added, if desired.

Suitable solid carriers for use herewith include lactose, magnesium stearate, starch, sucrose, mannitol, sorbitol, cellulose powder, dicalcium phosphate, talc, stearic acid, gelatin, agar pectin, acacia and the like. Suitable liquid carriers include glycols, polyglycols, peanut oil, olive oil, sesame oil, alcohols, water and the like. If desired, the carrier may include a time delay material such as glycerol monostearate, shellac or glycerol distearate, either alone or with wax.

Our composition preferably is provided in unit dosage forms for accuracy and convenience in oral administration. Such dosage forms which employ solid carriers include tablets, filled capsules, packets, lozenges, troches and the like. The amount of solid carrier per dosage unit may vary widely, e.g., from 25 mg. to 1 gram. depending upon the form selected and the choice of an appropriate amount is within the skill of an artisan once confronted with this disclosure.

Benzoguanamine, its selected derivatives and their salts may also be compounded with semi-solid and liquid carriers in solutions, suspensions, and emulsions, although it is believed that in oral administration, a dry dosage form is preferred where possible.

An inflammatory condition or a condition requiring ACTH therapy is treated in accordance with the invention by administering the preparation of this invention in an amount sufficient to alleviate the symptoms of the condition. The compound will be administered at a daily dosage of from 50 to 2000 mg. of the active ingredient disposed in a pharmaceutical carrier. A preferred daily amount of from 100 to 1000 mg. of the drug gives satisfactory results.

The dosage level and frequency of administration vary to a great extent and require the doctor to take into consideration the cause of the condition, the case history of the patient, the reaction of the subject and the like. The daily dosage may be administered during one or more times during the day. Tablets and hard gelatin capsules are especially well-suited for the practice of this invention.

To further aid in the appreciation and comprehension of the present invention, and not to limit its scope, the following examples are presented.

EXAMPLE I

To prepare 2,4-diamino-6-phenyl-s-triazine, 0.273 kg. of potassium hydroxide was dissolved in 5.5 liters 2-methoxyethanol. Stirring was started and 2.75 kg. dicyandiamide and 3.0 kg. benzonitrile were added. The temperature was raised to 90° C. whereupon an exothermic reaction took place and the temperature rose to reflux (125° C.). After 2 hours the mixture was cooled to 25° C. and filtered. The crude product was suspended in 8 liters water (65–70° C.) and filtered hot. The cake was washed with 2 liters water (65° C.). This washing procedure was repeated. The cake was dried under 29″ vacuum at 60° C. for 18 hours. The above crude cake was recrystallized from 130 liters ethanol and then 100 liters ethanol. The cake was dried at 29″ vacuum at 60° C. for 18 hours. The final product weighed 2.80 kg., M.P. 226.4–228.9° C. (lit. M.P. 227–8°).

*Analysis.*—Calculated for $C_9H_9N_5$ (percent): C, 57.54; H, 4.85; N, 37.42. Found (percent): C, 57.63; H, 4.93; N, 37.26

EXAMPLE II

Several dosage forms were prepared embodying the present invention. They are shown in Composition A through H below with 2,4-diamino-6-phenyl-s-triazine being shown as typical and noted as "benzoguanamine" to conserve space. The formulations are suitable for benzoguanamine, its selected derivatives or any of the acceptable salts of benzoguanamine and its selected derivatives.

Composition A

Tablets suitable for oral administration and having the following composition per tablet are produced by compounding the ingredients in the same relative proportions:

| Ingredients: | Amount, mg. |
|---|---|
| Benzoguanamine | 200 |
| Sorbitol | 15 |
| Mannitol | 85 |
| Gelatin, as a 10% aqueous solution | 6 |
| Corn starch | 30 |
| Magnesium stearate | 4 |

The first three ingredients are milled together to a uniform powder and granulated into the gelatin solution. The mixture is screened onto trays and dried at 60° C. The dried granules are sized, mixed with the corn starch and the magnesium stearate, and compressed into tablets.

Composition B

Tablets suitable for oral administration and having the following composition per tablet are produced by compounding the ingredients in the same relative proportions:

| Ingredients: | Amount, mg. |
|---|---|
| Benzoguanamine | 200 |
| Microcrystalline cellulose [1] | 150 |
| Polyvinyl pyrrolidone | 5 |
| Magnesium stearate | 4 |

[1] Avicel (FMC Corporation, U.S. Patent No. 2,978,446), average particle size 38 microns.

The first three ingredients are mixed to uniformity and lubricated with a portion of the magnesium stearate. The mixture is compressed into slugs, and the slugs are granulated. The granules are then lubricated with the remainder of the magnesium stearate and compressed into tablets.

Composition C

Filled gelatin capsules suitable for oral administration and containing the following composition in each capsule are produced by compounding the ingredients in the same relative proportions:

| Ingredients: | Amount, mg. |
|---|---|
| Benzoguanamine | 200 |
| Lactose | 175 |
| Magnesium stearate | 5 |

The above ingredients are screened through a #40 U.S. mesh screen to a uniform powder, transferred to a mixer, mixed well, and filled into #1 hard gelatin capsules.

Composition D

Filled soft gelatin capsules suitable for oral administration and containing the following composition in each capsule are produced by compounding the ingredients in the same relative proportions:

| Ingredients: | Amount, mg. |
|---|---|
| Benzoguanamine | 50 |
| Sesame oil | 50 |

The ingredients are mixed to form a thick slurry, and the slurry is filled into soft gelatin capsules.

Composition E

Filled soft gelatin capsules suitable for oral administration and containing the following composition in each capsule are produced by compounding the ingredients in the same relative proportions:

| Ingredients: | Amount, mg. |
|---|---|
| Benzoguanamine | 300 |
| Polyethylene Glycol 400 | 240 |

The ingredients are mixed to form a thick slurry, and the slurry is filled into soft gelatin capsules.

Composition F

Tablets used for oral administration and having the following composition per tablet are produced by compounding the ingredients in the same relative proportions:

| Ingredients: | Amount, mg. |
|---|---|
| Benzoguanamine | 200 |
| Dicalcium phosphate | 180 |
| Corn starch | 60 |
| Polyvinylpyrrolidone | 5 |
| Magnesium stearate | 4 |

The benzoguanamine, dicalcium phosphate and a portion of the starch and magnesium stearate are mixed, granulated with an alcoholic solution of the polyvinylpyrrolidone, dried, and sized. The remainder of the starch and the magnesium stearate are added and mixed. This mixture then is compressed into tablets.

Composition G

Tablets used for oral administration and having the following composition per tablet are produced by compounding the ingredients in the same relative proportions:

| Ingredients: | Amount, mg. |
|---|---|
| Benzoguanamine | 200 |
| Lactose | 200 |
| Microcrystalline cellulose | 30 |
| Polyvinylpyrrolidone | 5 |
| Amberlite XE-88 [1] | 5 |
| Magnesium stearate | 4 |

[1] Potassium salt of a carboxylic acid cation exchange resin obtained from Rohm & Haas, Philadelphia, Pa.

Composition H

Tablets useful for oral administration and having the following composition per tablet are produced by compounding the ingredients in the relative proportions indicated:

| Ingredients: | Amount, mg. |
|---|---|
| Benzoguanamine | 50 |
| Microcrystalline cellulose | 79 |
| Magnesium stearate | 1 |

Tablets may be white or colored with appropriate Food, Drug and Cosmetic or Drug and Cosmetic dyes.

EXAMPLE III 2,4 - diamino - 6-(3,4-methylenedioxyphenyl)-s-triazine was prepared by stirring a mixture of 14.3 g. (0.17 mole) of dicyandiamide, 25.0 g. (0.17 mole) of piperonylonitrile, 1.97 g. of potassium hydroxide pellets and 150 ml. of ethylene glycol monomethyl ether under reflux temperature for 5 hours. The solvent was removed under vacuum, and the solid residue was washed with 100 ml. of water. The insoluble residue was collected by filtration in a Buchner funnel, washed with 100 ml. of water and dried to yield 36.5 g. of product, M.P. 257–8° C. All of this material was recrystallized twice from 350 ml. of glacial acetic acid to yield 25.6 g. of 2,4-diamino-6-(3,4-methylenedioxyphenyl)-s-triazine, M.P. 257–8° C.

Analysis.—Calculated for $C_{10}H_9N_5O_2$ (percent): C, 51.94; H, 3.92; N, 30.30. Found (percent): C, 51.91; H, 4.14; N, 30.50.

EXAMPLE IV 2,4-diamino-6-(o-trifluoromethylphenyl)-s-triazine was prepared by refluxing for 5 hours a stirred mixture of 24.7 g. (0.16 mole) o-trifluoromethylbenzonitrile, 15.4 g. (0.18 mole) of dicyandiamide, 1.52 g. of potassium hydroxide pellets and 100 ml. of ethylene glycol monoethyl ether. The mixture was cooled to room temperature, and 200 ml. of water was added. The precipitate was collected by filtration in a Buchner funnel, washed with water and dried to yield 34.8 g. of crude product, M.P. 221–3° C. All of this material was dissolved in 700 ml. of 0.5 N hydrochloric acid solution and filtered. The filtrate was neutralized with concentrated ammonium hydroxide, and the precipitate was collected, washed with water and dried to yield 33.9 g. of 2,4-diamino-6-(o-trifluoromethylphenyl)-s-triazine, M.P. 228–3° C.

Analysis.—Calculated for $C_{10}H_8N_5F_3$ (percent): C, 47.07; H, 3.16; N, 27.45. Found (percent): C, 47.33; H, 3.28; N, 27.30.

EXAMPLE V 2,4-diamino-6-(m-trifluoromethylphenyl)-s-triazine was prepared by refluxing a stirred mixture of 8.5 g. (0.05 mole) of m-trifluorobenzonitrile, 4.6 g. (0.055 mole) of dicyandiamide, 0.56 g. of potassium hydroxide pellets and 50 ml. of ethylene glycol monomethyl ether for 8 hours. The solvent was removed by distillation under vacuum, and the residue was extracted with 150 ml. of boiling water. The insoluble material was collected by filtration in a Buchner funnel and dried to yield 10.5 g. of white solid, M.P. 206–7.5° C. This material was recrystallized twice from 30% aqueous dioxane to yield 7.6 g. of 2,4-diamino-6-(m-trifluoromethylphenyl)-s-triazine, M.P. 211–12° C.

Analysis.—Calculated for $C_{10}H_8N_5F_3$ (percent): C, 47.07; H, 3.16; N, 27.45; F, 22.35. Found (percent): C, 47.27; H, 3.31; N, 27.31; F, 21.75.

EXAMPLE VI 2,4 - diamino-6-(3,4,5-trimethoxyphenyl)-s-triazine was prepared by refluxing a stirred mixture of 5.39 g. (0.028 mole) of 3,4,5-trimethoxybenzonitrile, 2.73 g. (0.037 mole) of dicyandiamide, 0.27 g. of potassium hydroxide pellets and 100 ml. of ethylene glycol monoethyl ether for 5 hours. To the cooled mixture was added 200 ml. of water, and the precipitate was collected by filtration in a Buchner funnel, washed with water and dried to yield 6.7 g. of crude product, M.P. 254–5° C. All of this material was recrystallized twice from glacial acetic acid to yield 5.26 g. of 2,4-diamino-6-(3,4,5-trimethoxyphenyl)-s-triazine, M.P. 254–6° C.

Analysis.—Calculated for $C_{12}H_{15}N_5O_3$ (percent): C, 51.96; H, 5.45; N, 25.26. Found (percent): N, 52.12; H, 5.30; N, 25.44.

EXAMPLE VII 2,4 - diamino - 6-(3,4-dimethoxyphenyl)-s-triazine was prepared by refluxing a stirred mixture of 8.90 g. (0.055 mole) of cyanoveratrole, 5.32 g. (0.063 mole) of dicyandiamide, 0.53 g. of potassium hydroxide pellets and 100 ml. of ethylene glycol monoethyl ether for 5 hours. To the cooled mixture was added 200 ml. of water, and the precipitate was collected by filtration in a Buchner funnel, washed with water and dried to yield 12.85 g. of crude product, M.P. 180–1° C. All of this material was recrystallized from 50% aqueous methanol to yield 9.30 g. of 2,4 - diamino - 6-(3,4-dimethoxyphenyl)-s-triazine, M.P. 187–9° C.

Analysis.—Calculated for $C_{11}H_{13}N_5O_2$ (percent): C, 53.43; H, 5.30; N, 28.33. Found (percent): C, 53.50; H, 5.27; N, 28.24.

EXAMPLE VIII 2,4-diamino-6-(p-fluorophenyl)-s-triazine was prepared by refluxing a stirred mixture of 15.8 g. (0.13 mole) of p-fluorobenzonitrile, 13.9 grams (0.17 mole) of dicyandiamide, 1.38 g. of potassium hydroxide pellets and 120 ml. ethylene glycol monomethyl ether for 5 hours. To the cooled mixture was added 200 ml. of water, and the precipitate was collected by filtration in a buchner funnel, washed with water and dried to yield 15.4 g. of crude product M.P. 274–6° C. All of this material was recrystallized twice from glacial acetic acid to yield 14.4 g. of 2,4-diamino-6-(p-fluorophenyl)-s-triazine, M.P. 277–8° C.

Analysis.—Calculated for $C_9H_8N_5F$ (percent): C, 52.67; H, 3.93; N, 34.13. Found (percent): C, 52.45; H, 3.99; N, 34.01.

EXAMPLE IX 2,4-diamino-6-(n-fluoromethyl)-s-triazine was prepared by refluxing a stirred mixture of 15.8 g. (0.13 mole) of o-fluorobenzonitrile, 13.9 grams (0.17 mole) of dicyandiamide, 1.38 g. of potassium hydroxide pellets and 120 ml. ethylene glycol monomethyl ether for 5 hours. To the cooled mixture was added 200 ml. of water, and the precipitate was collected by filtration in a Buchner funnel, washed with water and dried to yield 12.0 g. of crude product, M.P. 240–3° C. All of this material was recrystallized twice from absolute ethanol to yield 5.2 g. of 2,4-diamino-6-(o-fluorophenyl)-s-triazine, M.P. 245.5–247.5° C.

*Analysis.*—Calculated for $C_9H_8N_5F$ (percent): C, 52.67; H, 3.93; N, 34.13. Found (percent): C, 52.51; H, 4.08; N, 33.97.

EXAMPLE X 2,4-diamino-6-(m-fluoromethyl)-s-triazine was prepared by refluxing a stirred mixture of 15.8 g. (0.13 mole) of m-fluorobenzonitrile, 13.9 grams (0.17 mole) of dicyandiamide, 1.38 g. of potassium hydroxide pellets and 120 ml. ethylene glycol monomethyl ether for 5 hours. To the cooled mixture was added 200 ml. of water, and the precipitate was collected by filtration in a Buchner funnel, washed with water and dried to yield 28.4 g. of crude product, M.P. 252–4° C. All of this material was recrystallized twice from absolute ethanol to yield 10 g. of 2,4-diamino-6-(m-fluoromethyl)-s-triazine, M.P. 252–5° C.

*Analysis.*—Calculated for $C_9H_8N_5F$ (percent): C, 52.67; H, 3.93; N, 34.13. Found (percent) C, 52.51; H, 3.73; N, 33.91.

EXAMPLE XI 2,4-diamino-6-(p-chlorophenyl)-s-triazine was prepared from 15.1 g. (0.11 mole) of p-chlorobenzonitrile, 11.7 g. (0.14 mole) of dicyandiamide, 1.16 g. of potassium hydroxide and 100 ml. of ethylene glycol monomethyl ether. The mixture was stirred and heated gradually to 110° C. when an exothermic reaction was initiated. Heating was discontinued until the reaction subsided, and the mixture was then refluxed for an additional 5 hours. The solvent was removed by distillation under vacuum. The residue was triturated with 20 ml. of hot water and the insoluble material was collected by filtration in a Buchner funnel, washed with water, and dried to yield 21.8 g. of crude product, M.P. 247–9° C. All of this material was recrystallized from 1100 ml. of ethanol to yield 18.3 g. of 2,4-diamino-6-(p-chlorophenyl)-s-triazine, M.P. 249–50° C.

*Analysis.*—Calculated for $C_9H_8N_5Cl$ (percent): C, 48.76; H, 3.64; N, 31.60. Found (percent): C, 48.98; H, 3.94; N, 31.73.

EXAMPLE XII 2,4-diamino-6-(m-chlorophenyl)-s-triazine was prepared from 9.63 g. (0.07 mole) of m-chlorobenzonitrile, 6.45 g. (0.077 mole) of dicyandiamide, 0.75 g. of potassium hydroxide and 100 ml. of ethylene glycol monomethyl ether. The mixture was stirred and heated gradually to 110° C. when an exothermic reaction was initiated. Heating was discontinued until the reaction subsided, and the mixture was then refluxed for an additional 5 hours. The solvent was removed by distillation under vacuum. The residue was triturated with 200 ml. of hot water and the insoluble material was collected by filtration in a Buchner funnel, washed with water and dried to yield 13.8 g. of crude product, M.P. 221–3° C. All of this material was recrystallized from 2-butanone to yield 9.0 g. of 2,4-diamino-6-(m-chlorophenyl)-s-triazine, M.P. 221–3° C.

*Analysis.*—Calculated for $C_9H_8N_5Cl$ (percent): C, 48.76; H, 3.64; N, 31.60. Found (percent): C, 48.93; H, 3.87; N, 32.01.

EXAMPLES XIII 2,4-diamino-6-(o-chlorophenyl)-s-triazine was prepared from 10.63 g. (0.077 mole) of o-chlorobenzonitrile, 7.00 g. (0.085 mole) of dicyandiamide, 0.83 g. of potassium hydroxide and 100 ml. of ethylene glycol monomethyl ether. The mixture was stirred and heated gradually to 110° C. when an exothermic reaction was initiated. Heating was discontinued until the reaction subsided, and the mixture was then refluxed for an additional 5 hours. The solvent was removed by distillation under vacuum. The residue was triturated with 200 ml. of hot water and the insoluble material was collected by filtration in a Buchner funnel, washed with water, and dried to yield 14.8 g. of crude product, M.P. 228–30° C. All of this material was recrystallized from 1,4-dioxane to yield 11.0 g. of 2,4-diamino-6-(o-chlorophenyl)-s-triazine, M.P. 230–2° C.

*Analysis.*—Calculated for $C_9H_8N_5Cl$ (percent): C, 48.16; H, 3.64; N, 31.60. Found (percent): C, 48.64; H, 3.46; N, 31.38.

EXAMPLE XIV

Benzoguanamine and selected derivatives as herein defined were tested for anti-inflammatory activity in rats using the Selye Granuloma Pouch assay described in Arch. Int. Pharmacodyn, 97, 139 (1954).

In this assay, 25 ml. of air is injected subcutaneously to form an air pouch on the dorsal side of the rats. An injection is made into each pouch, of 0.5 ml. of corn oil containing 1% of croton oil as an irritant. The irritant action causes the formation of an inflammatory exudate which averages 7 to 9 ml. at the end of 4 days.

The effect of administering the test compounds to groups of six rats were compared to the effects obtained in similar groups which received no test compound. Male rats obtained from Holtzman Company, Madison, Wis. and weighing 220 to 240 grams each, were used throughout the assay. The dorsal area of each animal was shaved with an electric clipper and the animals were placed under light ether anesthesia. The shaved regions were wiped with 70% ethanol, and 25 ml. of air was injected at the approximate center of each animal's shaved portion using a syringe and a 24 gauge needle.

The phlogistic agent was suspended to provide 0.125 mg. of agent in 0.5 ml. sesame oil. This suspension was then injected, using a 22 gauge needle, into the formed air pouch at a situs different from that of the air injection. All syringe needles were cleaned thoroughly with 70% ethanol between uses in successive animals. To insure accurate dosage, the phlogistic-agent suspension was continuously mixed with a magnetic stirrer. In all instances, air was removed 48 hours after formation of the pouch.

The compounds were administered orally in 1% aqueous pectin, initially at the time of introduction of the irritant and thrice subsequently at 24 hour intervals. The aqueous composition was administered to the animals at a constant volume of 1 ml. per 100 grams of body weight, and the triazine concentration was adjusted to provide the desired dosage level.

The animals were sacrificed 24 hours after the last administration, i.e., 4 days from the start of the test. The exudate formed in the pouch of each animal was removed and its volume measured. The percent inhibition of inflammation was determined as the quotient of: the average volume of exudate of the control minus the average exudate volume of the group of animals treated divided by the average volume of exudate of the control group of animals, multiplied by 100. The anti-inflammatory activities of a number of the compounds determined in this manner are shown in Table A below. The higher the value of "Percent Inhibition" the more effective the test compound is as an anti-inflammatory agent in this assay. A "Percent Inhibition" value of 30 or greater indicates the presence of anti-inflammatory activity.

TABLE A

Anti-inflammatory activities of 2,4-diamino-6-phenyl-s-triazine and substituted phenyl derivatives thereof using pouch assay

| Compound number | Phenyl substituent | Dose, mg./kg. | Percent inhibition |
|---|---|---|---|
| 1 | None | 200 | 97 |
|   |   | 100 | 70 |
|   |   | 50  | 73 |
|   |   | 20  | 17 |
| 2 | m-Methyl | 100 | 69 |
| 3 | o-Chloro | 200 | 55 |
| 4 | m-Chloro | 200 | 99 |
|   |   | 50  | 81 |
|   |   | 20  | 21 |
| 5 | p-Chloro | 200 | 83 |
|   |   | 100 | 33 |
| 6 | o-Fluoro | 200 | 96 |
|   |   | 20  | 21 |
| 7 | m-Fluoro | 200 | 99 |
| 8 | p-Fluoro | 100 | 83 |
|   |   | 50  | 84 |
| 9 | p-Methoxy | 200 | 27 |
| 10 | p-Dimethylamino | 200 | 86 |
| 11 | 3,4-dimethoxy | 200 | 86 |
| 12 | 3,4,5-trimethoxy | 200 | 24 |
| 13 | o-Trifluoromethyl | 200 | 25 |
| 14 | m-Trifluoromethyl | 100 | 97 |
| 15 | 3,4-methylenedioxy |   |   |
| 6 | p-Methyl | 100 | 28 |

EXAMPLE XV

The benzoguanamines and selected derivatives of this invention were tested for anti-inflammatory activity by a cotton pellet assay.

In this assay, cotton pellets weighing 10.0 mg. ±0.1 mg. are implanted in the lateral dorsal regions of adrenalectomized rats. An untreated control pellet is implanted on one side while the treated pellet is implanted on the other. The treated pellet contains 0.5 mg. of the test compound suspended in an aqueous medium containing, in grams per liter, 10 gm. of carboxymethylcellulose No. 70, 1 gram of polysorbate 80 U.S.P. (available as TWEEN 80 from Atlas Chemical Company), 1.8 grams of methyl-p-hydroxybenzoate, 0.2 gram of propyl-p-hydroxybenzoate, and 0.15 gram of Methocel. At least 4 to 10 animals are included in each of the test and control groups.

After 4 days, the pellets are removed, dried in vacuo at atmospheric temperature, and weighed. Reduction or inhibition of the formation of granulation tissue in the test pellets is determined as the difference between the weight of the control pellet and the weight of the test pellet in each case and the results are averaged for the respective groups. The results are reported in Table B below using the compound identification numbers defined in Table A. A reduction of granulation of at least about 1 mg. is an accepted indication of anti-inflammatory activity in this assay.

TABLE B

Anti-inflammatory activity as shown by cotton pellet assay

| Compound No.: | Reduction in granulation (mg.) |
|---|---|
| 1 | 0.5 |
| 2 | 0.2 |
| 3 | 0.3 |
| 4 | −0.6 |
| 5 | 1.27 |
| 6 | −0.1 |
| 7 | 0.5 |
| 8 | 1.67 |
| 9 | 2.04 |
| 10 | 0.5 |
| 11 | −0.02 |
| 12 | −0.01 |
| 13 | 1.53 |
| 14 | — |
| 15 | — |
| 16 | −0.03 |

EXAMPLE XVI

Benzoguanamine and its selected derivatives were tested again for anti-inflammatory activity using the carrageenin edema test described by Winter et al. [Proc. Soc. Exp. Biol. Med., 111, 544 (1962)].

The compounds were administered in pectin suspension by gavage at a dosage of 100 mg./kg. to adult male Holtzman rats 1 hour before injection of 0.05 ml. of 1% suspension of carrageenin in sterile 0.9% sodium chloride solution into the plantar tissue of the right hind paw. Each drug was administered to a group of 6 rats. The volume of the injected foot was measured immediately and then again, 3 hours later. The average increase in volume was calculated and compared with that of control animals which received pectin only before injection with 0.05 ml. of the 1% carrageenin suspension. The percent inhibition was then calculated for each drug in the manner described in Example XIV.

TABLE C

Anti-inflammatory activity as shown by carrageenin assay

| Compound Number | Dose, mg./kg. | Percent inhibition |
|---|---|---|
| 1 | 200 | 62 |
| 2 | 100 | 15 |
| 3 | 100 | 18 |
| 4 | 100 | 58 |
| 5 | 100 | 48 |
| 6 | 100 | 49 |
| 7 | 100 | 49 |
| 8 | 200 | 51 |
| 9 | 100 | 17 |
| 10 | 100 | 23 |
| 11 | 100 | 1 |
| 12 | 100 | 0 |
| 13 | 100 | 0 |
| 14 | 200 | 51 |
| 15 | 100 | 73 |
| 16 | 100 | 14 |

Evaluation of the results of this particular assay are based on percent inhibition and it comprises: very active, 40% or greater; moderately active, 20–40%; relatively inactive, less than 20%.

EXAMPLE XVII

Benzoguanamine was tested in a rat carrageenin assay in which the right hind paws of the rats are injected with carrageenin, an inflammatory substance. The benzoguanamine was administered to two groups of intact rats, orally to one group and subcutaneously to the other. The benzoguanamine was administered one hour before the carrageenin injection and the inflammatory edema volumes were measured three hours after administration of the carrageenin. The values shown in Table D are the percent inhibition of mean edema volumes of the drug treated versus the control groups, each having five rats per group.

TABLE D

Activity of benzoguanamine in carrageenin anti-inflammatory assay

| Dose (mg./kg.) | Percent inhibition (groups) | |
|---|---|---|
|  | Oral | Subcutaneous |
| 10.0 | 33 | 33 |
| 31.6 | 44 | 53 |
| 100.0 | 61 | 53 |

The data summarized in Table D are consistent with those presented for benzoguanamine in Table C and show a dose-related response.

EXAMPLE XVIII

Phase I clinical studies (in normal male volunteers) were performed with 2,4-diamino-6-phenyl-s-triazine (shown as "Compound No. 1" in previous examples) which indicated that graduated oral dosage adjusted at weekly intervals and maintained for one week at 300 mg. per day produced increased amounts of urinary 17-hydroxycorticosteroids indicative of elevated circulating corticosteroids. The average increase was 487% of the control (Range: 94% to 1070%).

EXAMPLE XIX

In order to determine whether benzoguanamine had a specific effect on the pituitary-adrenal axis, intact and 24 hour hypophysectomized rats were administered a single oral dose of 200 mg./kg., and adrenals removed 3 hours later for determination of ascorbic acid content. Adrenal ascorbic acid was reduced 48% in intact rats given benzoguanamine, while no effect was observed in hypophysectomized rats. These data indicate that acute administration of benzoguanamine to rats can activate the pituitary-adrenal axis causing ACTH release and subsequent adrenal stimulation.

EXAMPLE XX

Benzoguanamine and its selected derivatives were tested for their ability to deplete adrenal ascorbic acid. This is a standard assay for ACTH activity.

The drugs were administered orally at a dosage of 200 mg./kg. to Sprague-Dawley female rats weighing 100–120 g. The rats were sacrificed 3 hours later by ether anesthesia and the adrenal glands were removed, cleaned, weighed, and frozen in 0.5 ml. of 2.5% metaphosphoric acid.

The frozen glands were then partially thawed and ground with a Potter-Elvehjem homogenizer. The homogenate was diluted to 10 ml. with 2.5% metaphosphoric acid and filtered. The filtrate was treated with a solution of 2,6-dichloroindophenol in sodium acetate. The intensity of the colors developed was measured in a photoelectric colorimeter equipped with a suitable filter. The concentration of ascorbic acid in the filtrate from the homogenate was determined by comparison with standard solutions of ascorbic acid treated in a similar manner. The total ascorbic acid from the adrenal glands of drug-treated animals were compared with that of untreated control animals, and the percent depletion of ascorbic acid calculated.

The results obtained in this assay are reported in Table E below. A compound producing an ascorbic acid depletion of −15% or greater is considered significantly active in this assay.

TABLE E

Rat adrenal ascorbic acid depletion by benzoguanamine and selected derivatives thereof

| Compound Number | Dose, mg./kg. | Time, hours | Percent change |
|---|---|---|---|
| 1 | 200 | 3 | −48 |
| 2 | 200 | 3 | −21 |
| 3 | 200 | 3 | 4 |
| 4 | 200 | 3 | −53 |
| 5 | 200 | 3 | −56 |
| 6 | | | |
| 7 | | | |
| 8 | 200 | 3 | −50 |
| 9 | 200 | 3 | −16 |
| 10 | | | −33 |
| 11 | 200 | 3 | −33 |
| 12 | 200 | 3 | −26 |
| 13 | 200 | 3 | −28 |
| 14 | | | |
| 15 | | | |
| 16 | 200 | 2 | −29 |

EXAMPLE XXI

Dexamethasone has been shown by Russel et al. [See: Endocrin., 85, 512 (1969)] to inhibit the hypothalamic centers which elaborate a corticotrophin-releasing factor (CRF), and therefore to block the ACTH release which occurs in response to certain non-specific stressors, such as ether inhalation, heat-immobilization, and injection of histamine or epinephrine. Dexamethasone block of ether stress was confirmed in the present studies by administration of a single subcutaneous dose of 1 mg./kg. dexamethasone 2 hours prior to 60 seconds ether inhalation. Control rats were injected with vehicle and placed in a similar container with no ether. One hour after sham or ether stress, adrenals were removed for ascorbic acid analysis. Pretreatment with dexamethasone completely prevented the depletion of adrenal ascorbic acid caused by 60 seconds of ether inhalation.

In order to further establish a relationship between benzoguanamine and the hypothalamic-pituitary system, dexamethasone was administered to rats overnight in the drinking water at a dose calculated (and found) to be 5 mg./kg. The following morning, vehicle or 200 mg./kg. benzoguanamine per os was given and the adrenal ascorbic acid content and plasma corticosterone levels were determined 1 hour later. Dexamethasone pretreatment effectively prevent benzoguanamine-induced adrenal ascorbic acid depletion, and the plasma corticosterone elevation produced by benzoguanamine. These data indicate that benzoguanamine through release of ACTH is responsible for the observed depletion of adrenal ascorbic acid and elevation of plasma corticosterone levels in intact rats.

EXAMPLE XXII

A direct comparison of the effects of a single oral dose of benzoguanamine and a single subcutaneous dose of ACTH (in 16% gelatin vehicle) upon adrenal ascorbic acid content and corticosterone levels was made. In an experiment which incorporated a large number of dosage levels, potency estimates based on adrenal ascorbic acid depletion indicated that, in a 100 gram rat, 10 mg. benzoguanamine per os was equivalent to about 200–240 milliunits (m$\mu$) ACTH given subcutaneously and estimates based on corticosterone levels indicated the value was about 235–245 m$\mu$ ACTH.

EXAMPLE XXIII

Administration of a single dose (300 mg.) of benzoguanamine to normal human subjects caused an acute rise in plasma corticosteroids without other evidence of stress. There were no changes in blood glucose levels or in thyrotropin levels.

Tests in patients with Addison's disease (whose adrenal glands are unresponsive to ACTH stimulation) showed that benzoguanamine has no effect on the rate of disappearance of exogenous cortisol from the circulation.

The two experiments taken together support the proposed mechanism of action of benzoguanamine; namely, its stimulating effect upon the pituitary-adrenal system rather than slowing the normal disappearance rate of plasma cortisol which could also produce an elevated corticosteroid level. See: J. A. Pittman et al. "Corticosteroid Stimulation in Man With A New Drug, AL–0770" (unpublished) AL–0770 is Armour Pharmaceutical Company's laboratory code for 2,4-diamino-6-phenyl-s-triazine.

EXAMPLE XXIV

In early clinical studies (Besser et al., to be published in LANCET), twenty normal volunteers (3 female), aged 18 to 34, were treated with single doses of benzoguanamine per os.

Eight subjects received 300 mg., 4 received 400 mg. and 8 received 600 mg. of benzoguanamine per os. Each subject also received placebo medication and was employed as his own control. Allocation of the paired treatments was on a double blind randomized and balanced basis, half the subjects receiving the active treatment first and the other half the placebo treatment first. At least 24 hours elapsed between active and placebo treatment.

The subjects were fasted overnight and the drug was administered at 9:30 A.M., at least 60 minutes after insection of an indwelling intravenous cannula. Venous blood was obtained before and at 30 minute intervals for either 3 hours (300 mg. and 400 mg. studies) or 5 hours (600 mg. studies) after oral administration of benzoquanamine or placebo tablets. Trisodium EDTA was used as the anticoagulant.

Each blood sample was analysed for the concentration of plasma fluorigenic corticosteroids by the method of Mattingly reported in J. Clin. Path. 15, 374 (1962). A modification of Mattingly's method was employed to measure plasma levels of benzoguanamine. Endogenous or added corticosteroids did not interfere with the assay of benzoguanamine nor did the presence of the drug in plasma interfere with the assay of the corticosteroids.

Changes in the hormone concentrations from the starting levels were compared after the paired treatments using Student's "t"-test (2-tailed) (See: Snedecor, G. W., Statistical Methods, 4th ed. Iowa State Collage Press, Ames, Iowa, 1946). The results of these tests on the normal subjects revealed that benzoguanamine caused significant elevations in plasma corticosteroid concentrations compared with the levels found after the placebo treatments (p=<0.001). The mean rise in plasma fluorigenic corticosteroids after a dose of 600 mg. was 11.6 ±2.31 (SE) μg./ml. greater than after the placebo and after 300 mg. the mean rise was 8.3±1.44 μg./ml. Each mean rise was significantly greater than that after the corresponding placebo treatment (p=<0.01). The mean rise after 400 mg. benzoguanamine, 14.0±5.21 μg./100 ml., did not achieve significance when compared to placebo because there were only 4 subjects in this group.

There was a significant correlation between the maximum blood level of benzoguanamine and the maximum concentration of fluorigenic corticosteroids, both peaks appearing between 3 and 3 hours after administration of the drug.

EXAMPLE XXV

Dexamethasone phosphate (0.5 mg. each 6 hours for 48 hours) was administered by mouth to 2 subjects. Both subjects were then given 600 mg. benzoguanamine. There was no increase in their plasma fluorigenic corticosteroid levels when their pituitary-adrenal axes were suppressed with dexamethasone, whereas both had normal responses when benzoguanamine was given without pretreatment with dexamethasone; equivalent plasma fluorigenic benzoguanamine levels (ranging from 4.6 to 5.1 μg./ml.) were achieved with and without dexamethasone. (See: Besser et al., ibid).

EXAMPLE XXVI

Benzoguanamine was tested in a rat carrageenin assay in which the right hind paw of the rat was injected with carrageenin, an inflammatory substance. The benzoguanamine was administered intramuscularly to the left hind limb of the rat. The benzoguanamine was administered to three groups of intact rats one hour before the carrageenin injection and the anti-inflammatory edema volumes were measured three hours after administration of the carrageenin. A fourth group of 5 rats did not receive benzoguanamine and served as a control. Percent Inhibition were determined for each test group using the calculation described in Example XVII. The results are:

| Dose (mg./kg.): | Percent inhibition |
|---|---|
| 100 | 37 |
| 31.6 | 31 |
| 10 | 16 |

From the foregoing, it becomes apparent that new and quite remarkable pharmaceutical preparations have been herein described and illustrated which have the surprising ability when administered to a host to cause the secretion of quantities of endogenous adrenocorticotropin hormone which in turn increases the blood levels of endogenous adrenocorticosteroids to the benefit of the host. Furthermore, the steroids thus induced have the further benefit of exercising a limit upon the ACTH secretion and thereby protecting the host from the adverse effects of hyperadrenocorticosteroidism. It is, of course, understood that the artisan confronted with this disclosure will contemplate various alterations, modifications and applications all of which are intended to be encompassed within the spirit of this invention especially as it is defined by the scope of the claims appended hereto.

What we claim is:

1. A pharmaceutical preparation which when administered to a host, has the property of elevating the level of circulating adrenocorticosteroids by stimulating the pituitary-adrenal axes of said host, said preparation comprising a non-toxic pharmaceutical carrier and from about 50 mg. to about 2000 mg. of a compound selected from the group consisting of the 2,4-diamino-6-phenyl-s-triazines and the non-toxic acid salts thereof, said compound having the structure:

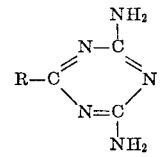

wherein R is phenyl or a substituted phenyl in which the substituting moiety is selected from the group consisting of halo, alkyl having 1 to 4 carbon atoms, alkoxy having 1 to 4 carbon atoms and fluoroalkyl having 1 to 4 carbon atoms.

2. A preparation according to claim 1 in a unit dosage form selected from the group consisting of tablets, capsules, lozenges, packets, troches, solutions, suspensions and emulsions.

3. A preparation according to claim 2 in which the substituting moiety is selected from the group consisting of fluoro, chloro, methyl, methoxy, 3,4-dimethoxy, 3,4,5-trimethoxy, 3,4-methylene dioxy, and trifluoromethyl.

4. A preparation according to claim 3 containing from about 100 mg. to about 1000 mg. of said compound.

5. A preparation according to claim 4 in which said compound is selected from the group consisting of 2,4-diamino-6-phenyl-s-triazine, 2,4-diamino-6-fluorophenyl-s-triazine, 2,4-diamino-6-chlorophenyl-s-triazine, 2,4-diamino-6-(3,4-methylenedioxidephenyl)-s-triazine, 2,4-diamino-6-(3,4-dimethoxyphenyl)-s-triazine, and 2,4-diamino-6-trifluoromethylphenyl-s-triazine.

6. A preparation according to claim 2 in which said carrier is selected from the group consisting of lactose, magnesium stearate, starch, sucrose, mannitol, sorbitol, cellulose powder, dicalcium phosphate, talc, polyvinyl pyrrolidone, stearic acid, gelatin, agar pectin, acacia, glycols, polyglycols, peanut oil, olive oil, sesame oil, alcohol, water and mixtures thereof.

7. The method of inducing the release of endogenous adrenocorticosteroids in a host, including man, having a functioning pituitary and adrenal cortex, while protecting said host from hyperadrenocorticosteroidism, comprising orally administering to said host from about 50 mg. to about 2000 mg. of a compound having the structure

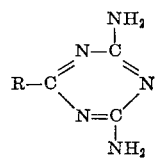

wherein R is phenyl or a substituted phenyl in which the substituting phenyl is selected from the group consisting of halo, alkyl having 1 to 4 carbon atoms, alkoxy having 1 to 4 carbon atoms, and fluoroalkyl having 1 to 4 carbon atoms.

8. The method of claim 7 in which said compound is administered to said host on a daily regimen of from about 100 mg. to about 1000 mg.

9. The method of claim 7 in which said compound is 2,4-diamino-6-phenyl-s-triazine.

10. The method of claim 7 in which said compound is 2,4-diamino-6-chlorophenyl-s-triazine.

11. The method of claim 7 in which said compound is 2,4-diamino-6-fluorophenyl-s-triazine.

12. The method of claim 7 in which said compound is 2,4-diamino-6-(3,4-methylenedioxyphenyl)-s-triazine.

13. The method of treating an inflammatory condition in a host, including man, comprising administering to said host from about 50 mg. to about 2000 mg. of a compound having the structure

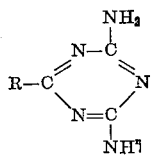

wherein R is phenyl or a substituted phenyl in which the substituting phenyl is selected from the group consisting of halo, alkyl having 1 to 4 carbon atoms, alkoxy having 1 to 4 carbon atoms, and fluoroalkyl having 1 to 4 carbon atoms.

14. The method of claim 13 in which said compound is administered subcutaneously.

15. The method of claim 13 in which said compound is administered orally.

16. The method of claim 13 in which said compound is administered to said host on a daily regimen of from about 100 mg. to about 1000 mg.

17. The method of claim 13 in which said compound is 2,4-diamino-6-phenyl-s-triazine.

18. The method of claim 13 in which said compound is 2,4-diamino-6-chlorophenyl-s-triazine.

19. The method of claim 13 in which said compound is 2,4-diamino-6-fluorophenyl-s-triazine.

20. The method of claim 13 in which said compound is 2,4-diamino-6-(3,4-methylenedioxyphenyl)-s-triazine.

References Cited
UNITED STATES PATENTS

| | | | |
|---|---|---|---|
| 2,761,779 | 9/1956 | Lindenfelsen et al. | 260—249.9 |
| 3,155,661 | 11/1964 | Foreman et al. | 260—249.9 |
| 3,344,137 | 9/1967 | Bader | 260—249.9 |
| 3,478,026 | 11/1969 | Enkoji et al. | 260—249.9 |

STANLEY J. FRIEDMAN, Primary Examiner

U.S. Cl. X.R.

260—249.9